(12) United States Patent
Pourshalchi

(10) Patent No.: US 11,555,788 B2
(45) Date of Patent: Jan. 17, 2023

(54) NONDESTRUCTIVE FLUID SENSING

(71) Applicant: Alexander K. Pourshalchi, San Diego, CA (US)

(72) Inventor: Alexander K. Pourshalchi, San Diego, CA (US)

(73) Assignee: Alexander K. Pourshalchi, San Diego, CA (US)

(*) Notice: Subject to any disclaimer, the term of this patent is extended or adjusted under 35 U.S.C. 154(b) by 216 days.

(21) Appl. No.: 16/819,111

(22) Filed: Mar. 15, 2020

(65) Prior Publication Data
US 2021/0285889 A1  Sep. 16, 2021

(51) Int. Cl.
| | |
|---|---|
| *G01N 21/85* | (2006.01) |
| *G01N 21/65* | (2006.01) |
| *G01J 3/44* | (2006.01) |
| *G01N 27/06* | (2006.01) |
| *G01N 15/14* | (2006.01) |
| *G01N 21/53* | (2006.01) |
| *G01N 21/31* | (2006.01) |
| *G01N 21/25* | (2006.01) |

(52) U.S. Cl.
CPC .............. *G01N 21/85* (2013.01); *G01J 3/44* (2013.01); *G01N 21/658* (2013.01)

(58) Field of Classification Search
CPC ........ G01N 21/85; G01N 21/53; G01N 21/25; G01N 21/251; G01N 21/256; G01N 21/47; G01N 27/06; G01N 27/08; G01J 3/44
See application file for complete search history.

(56) References Cited

U.S. PATENT DOCUMENTS

| | | | | |
|---|---|---|---|---|
| 6,100,975 | A * | 8/2000 | Smith | G01N 21/65 372/92 |
| 2012/0309080 | A1* | 12/2012 | Cunningham | G01N 21/658 977/782 |
| 2017/0328836 | A1* | 11/2017 | Lu | G02B 6/032 |

FOREIGN PATENT DOCUMENTS

WO  WO-2015146036 A1 * 10/2015 ............. G01N 21/05

\* cited by examiner

*Primary Examiner* — Daniel J Colilla

(57) ABSTRACT

The Nondestructive Fluid Sensing System is a device that rapidly scans fluids to determine physical and chemical properties of the sample fluid. The Nondestructive Fluid Sensing System can detect the presence of a sample fluid with various optical and electrical sensors, and determines physical and chemical properties. The system features several innovations that increase sample throughput, reduces sample cross contamination, and eliminates waste products typically used in chemical tests. The system may be applied to various industries including manufacturing quality control, and healthcare.

3 Claims, 12 Drawing Sheets

Figure #1:
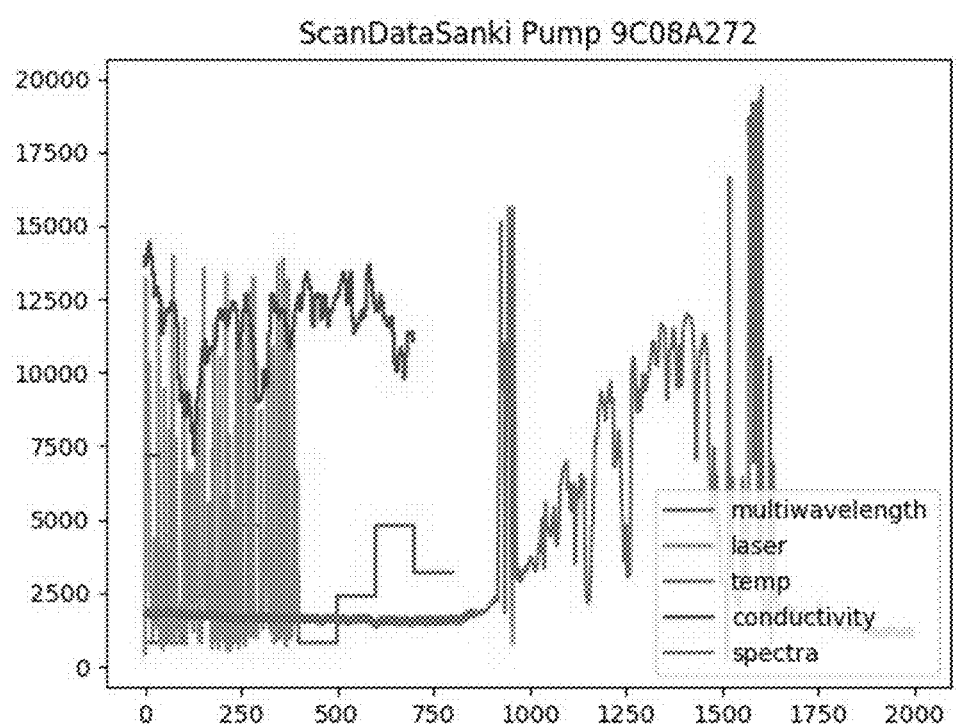

Figure #2:
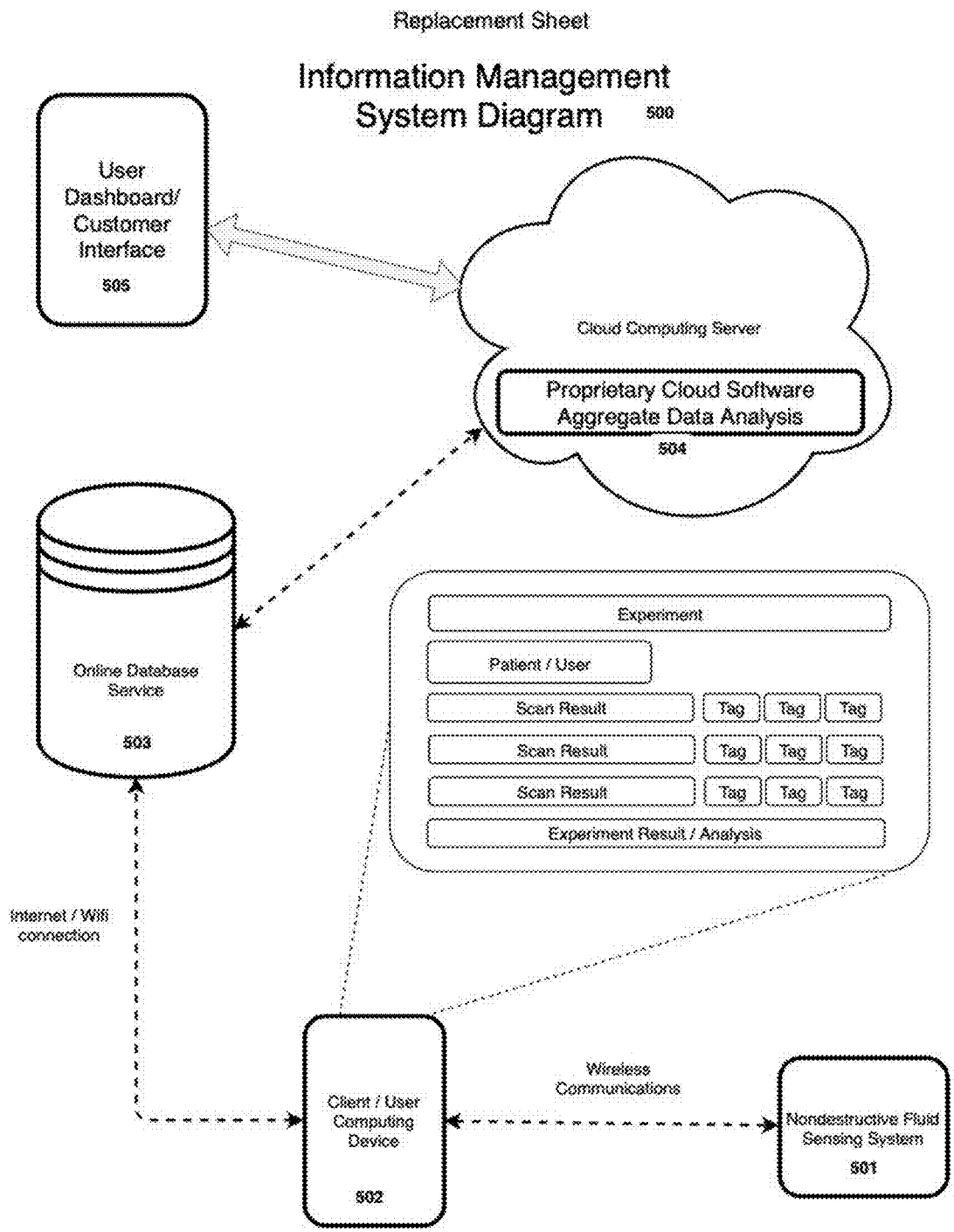

Figure #3:
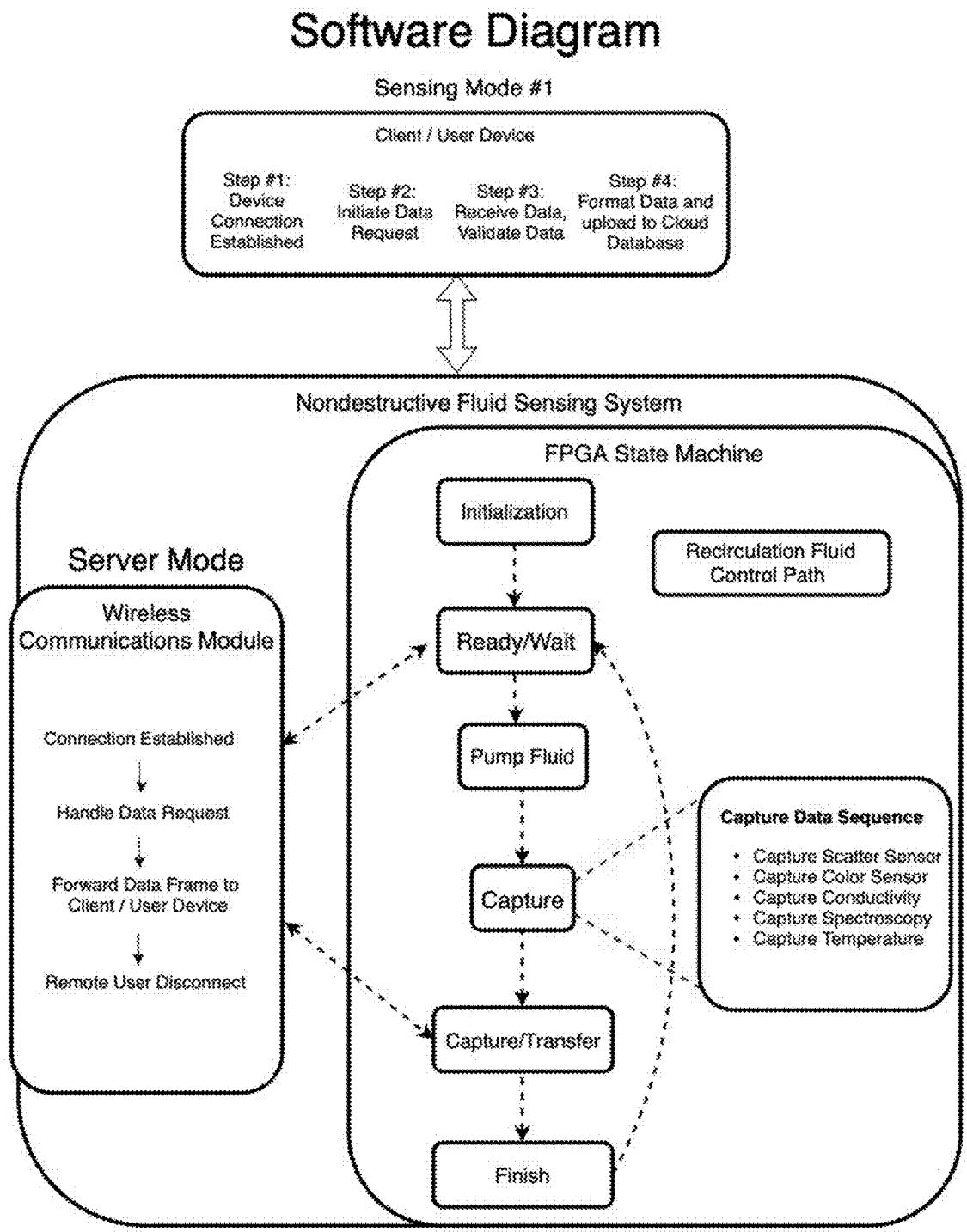

Figure # 4:
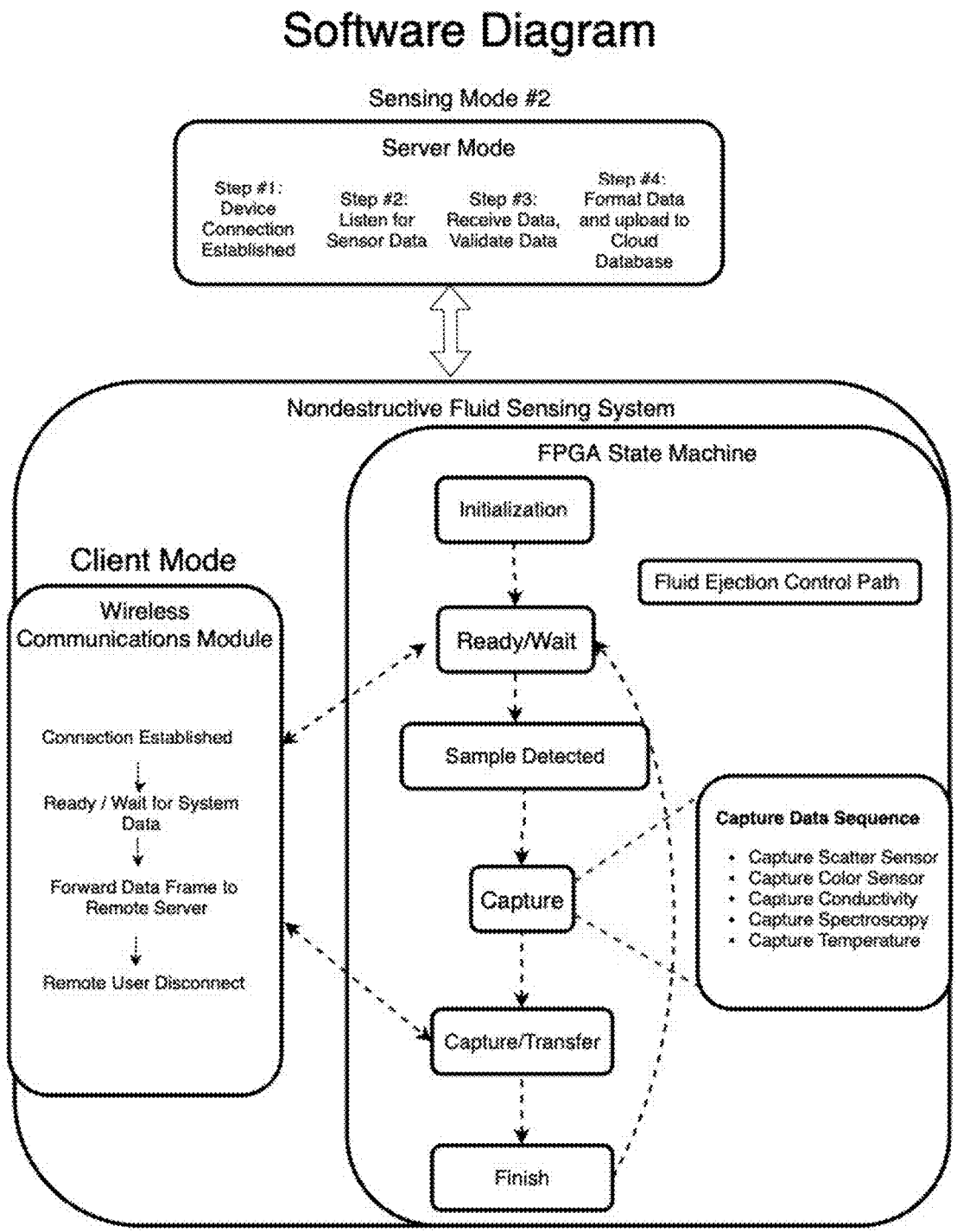

Figure #5:
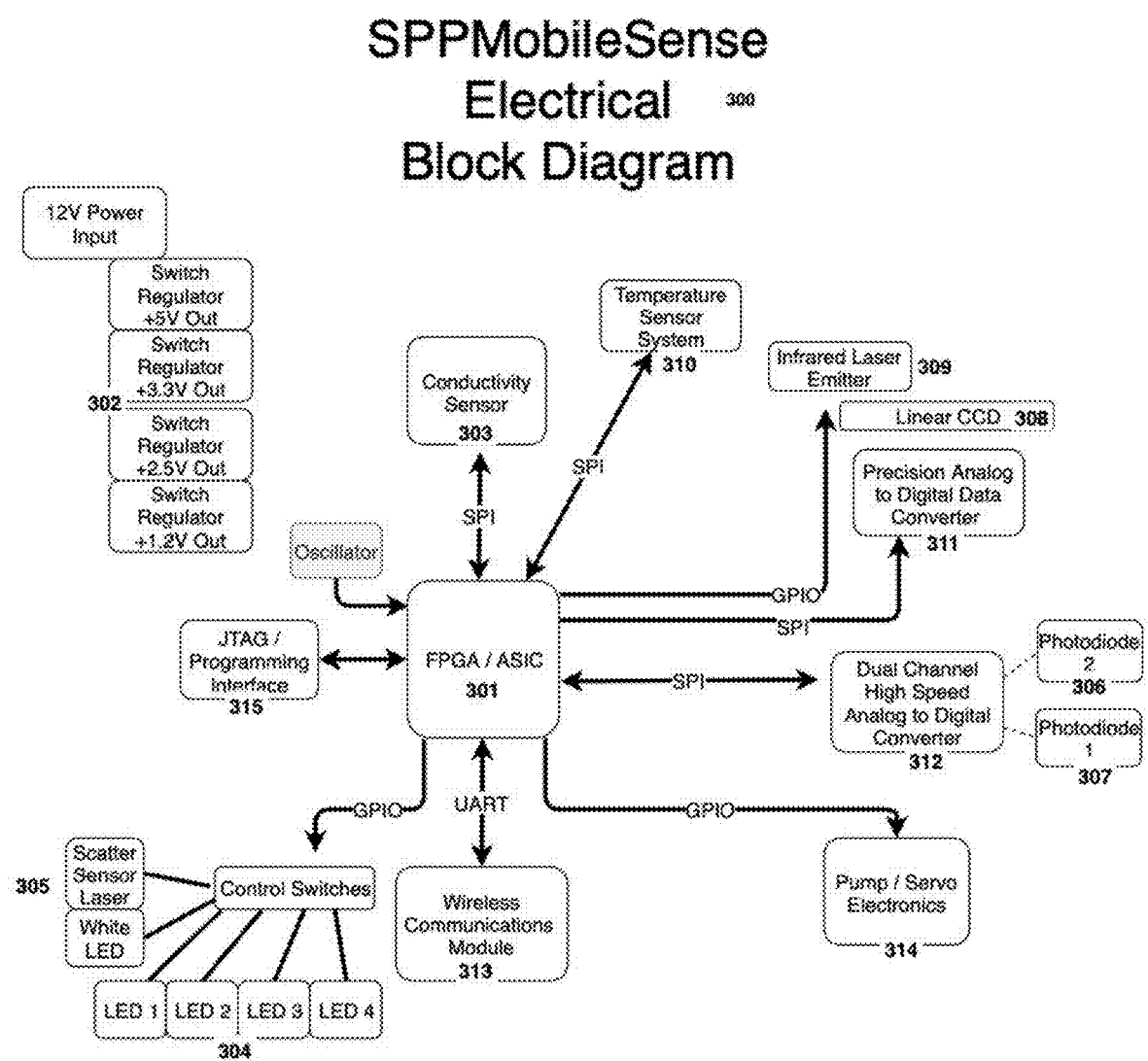

Figure #6:
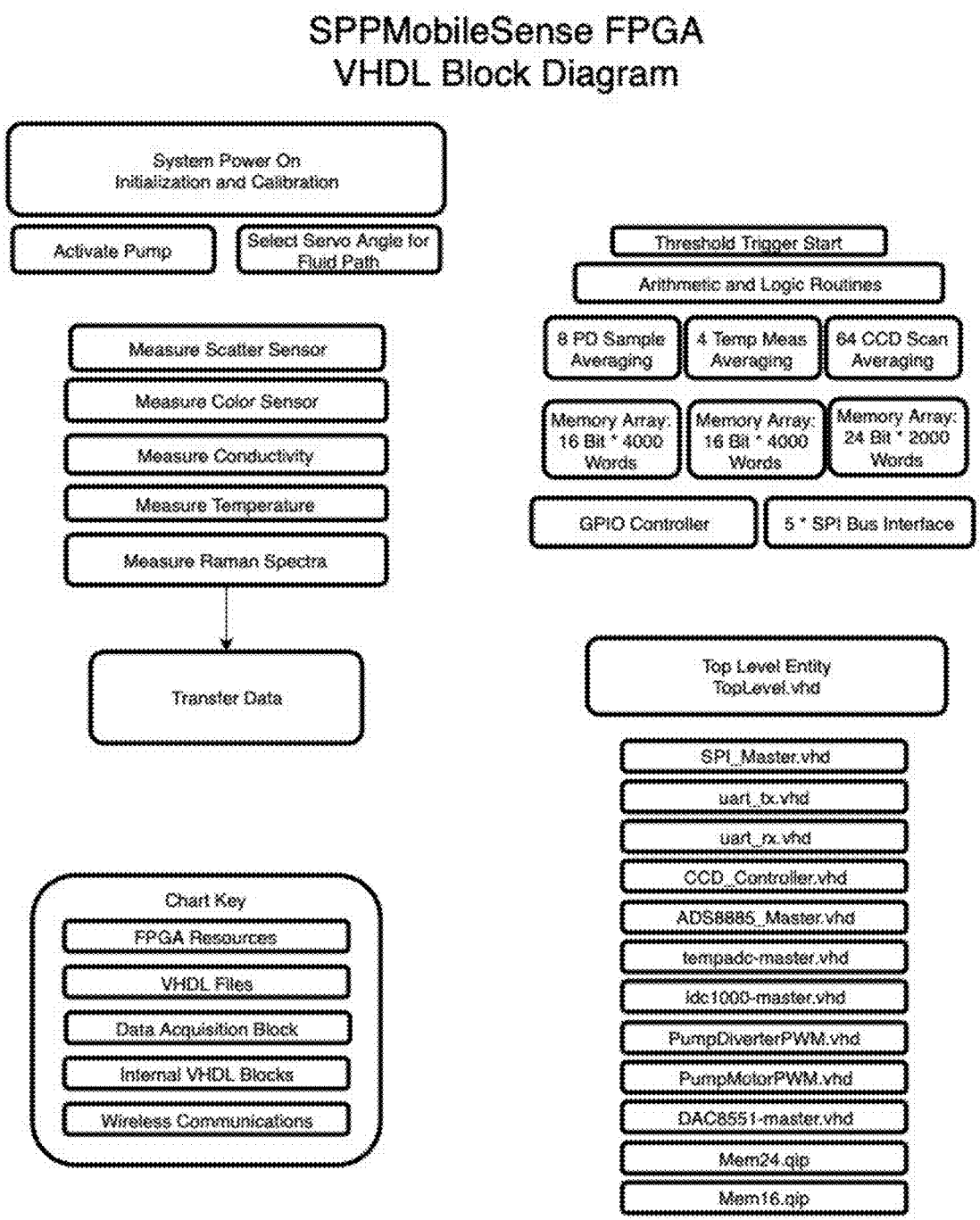

Figure #7:
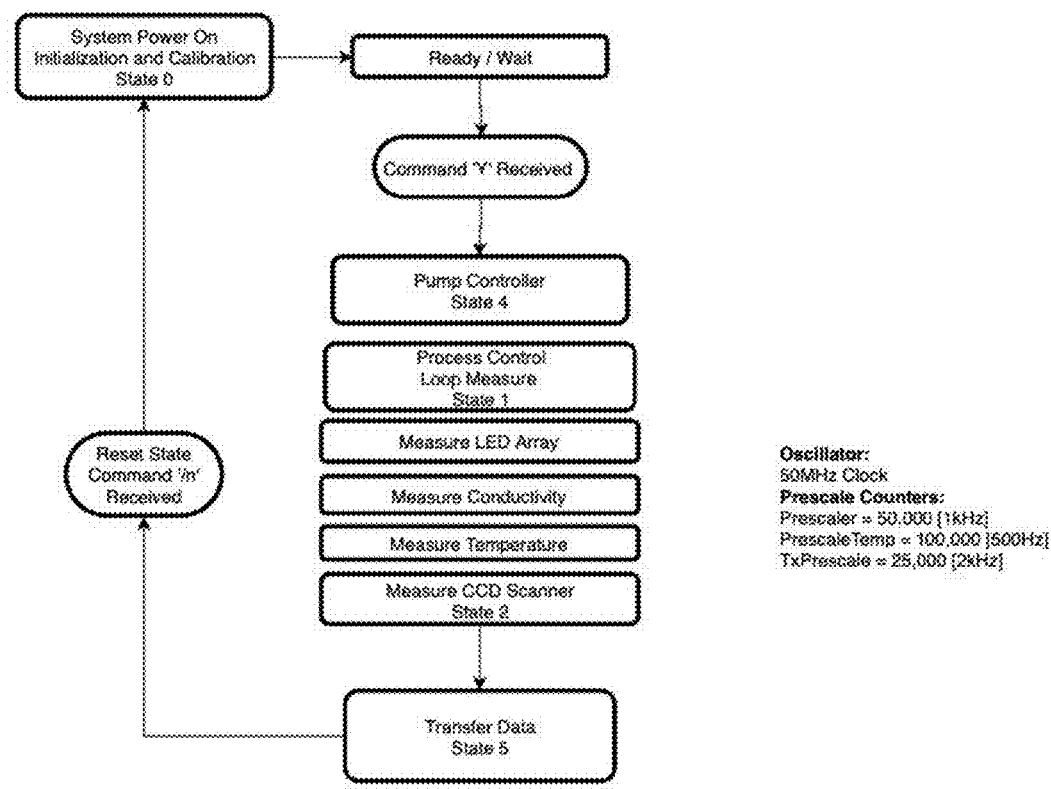
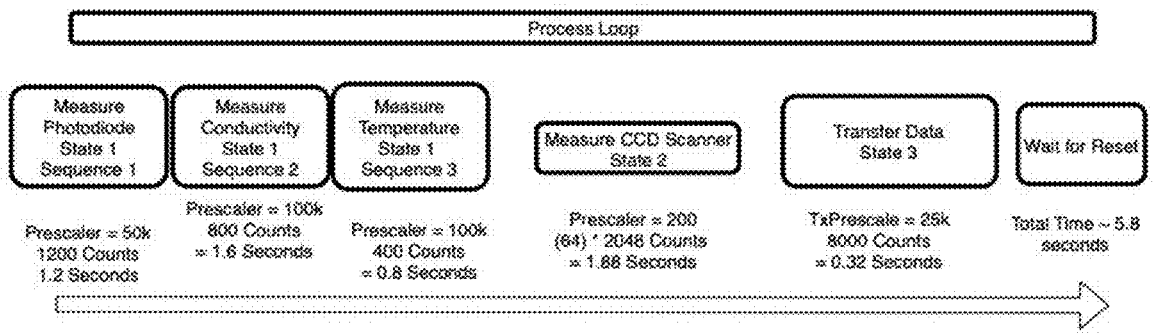

Figure #8:
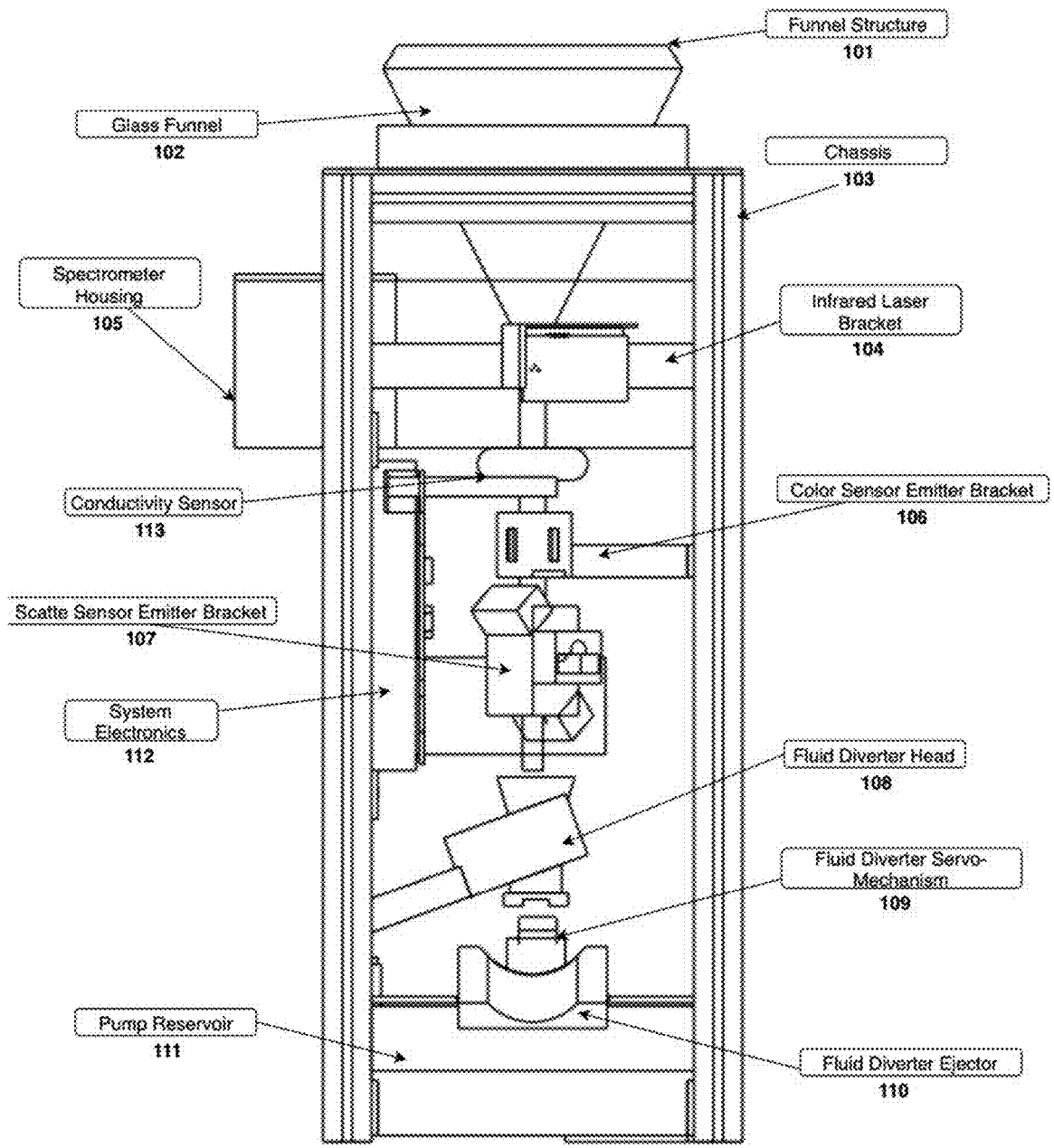

Figure #9:
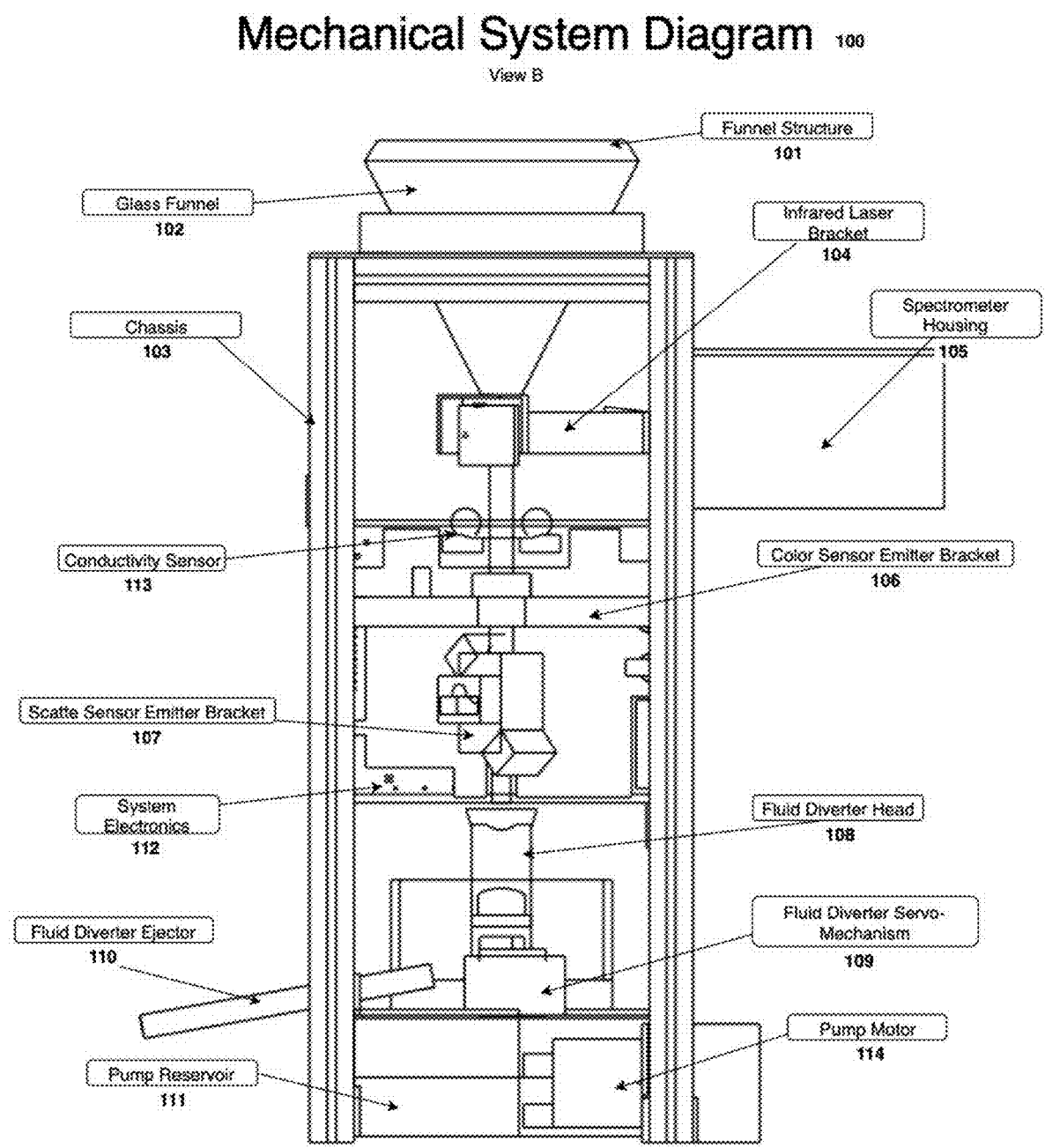

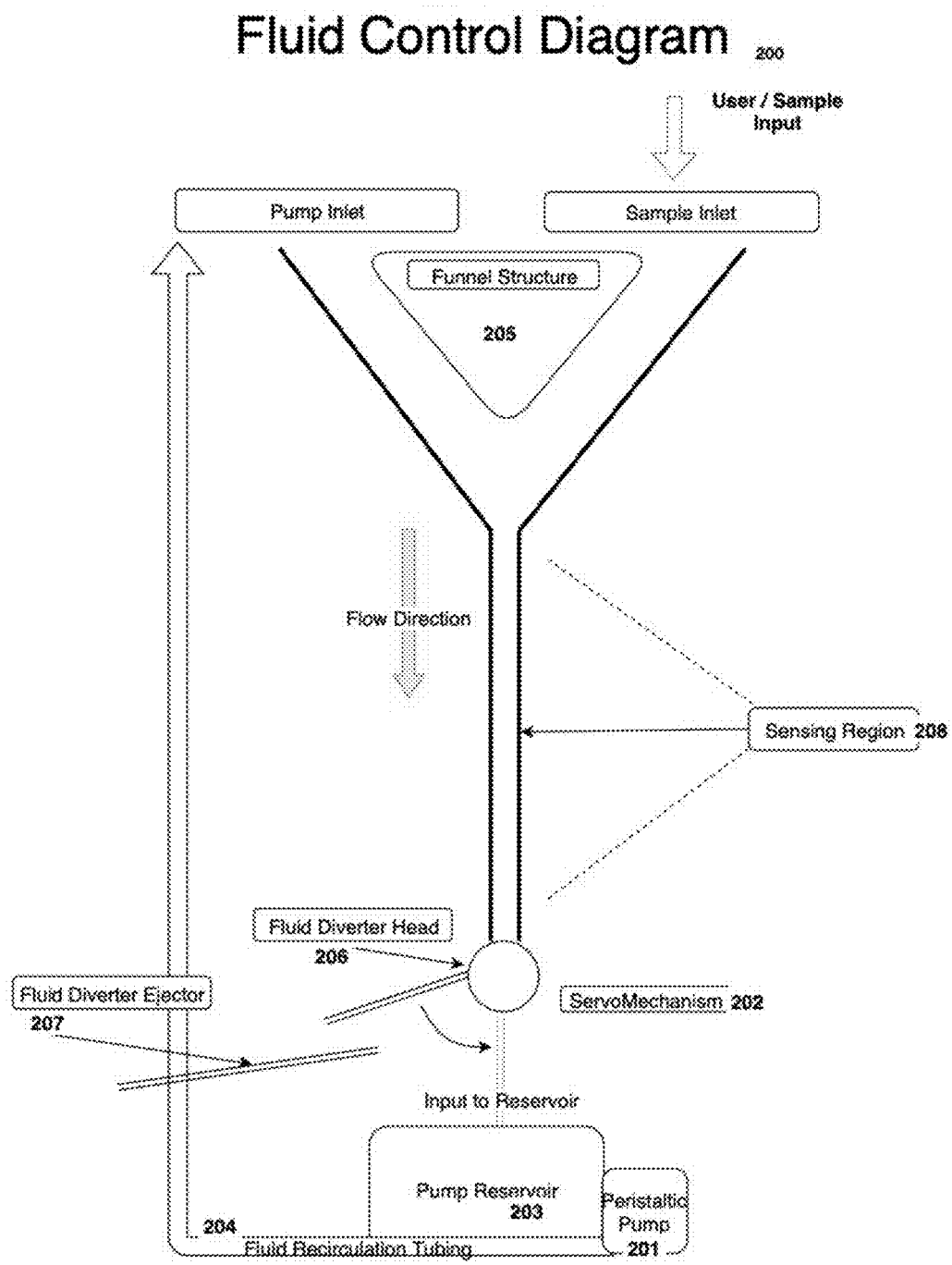
Figure #10

Figure #11
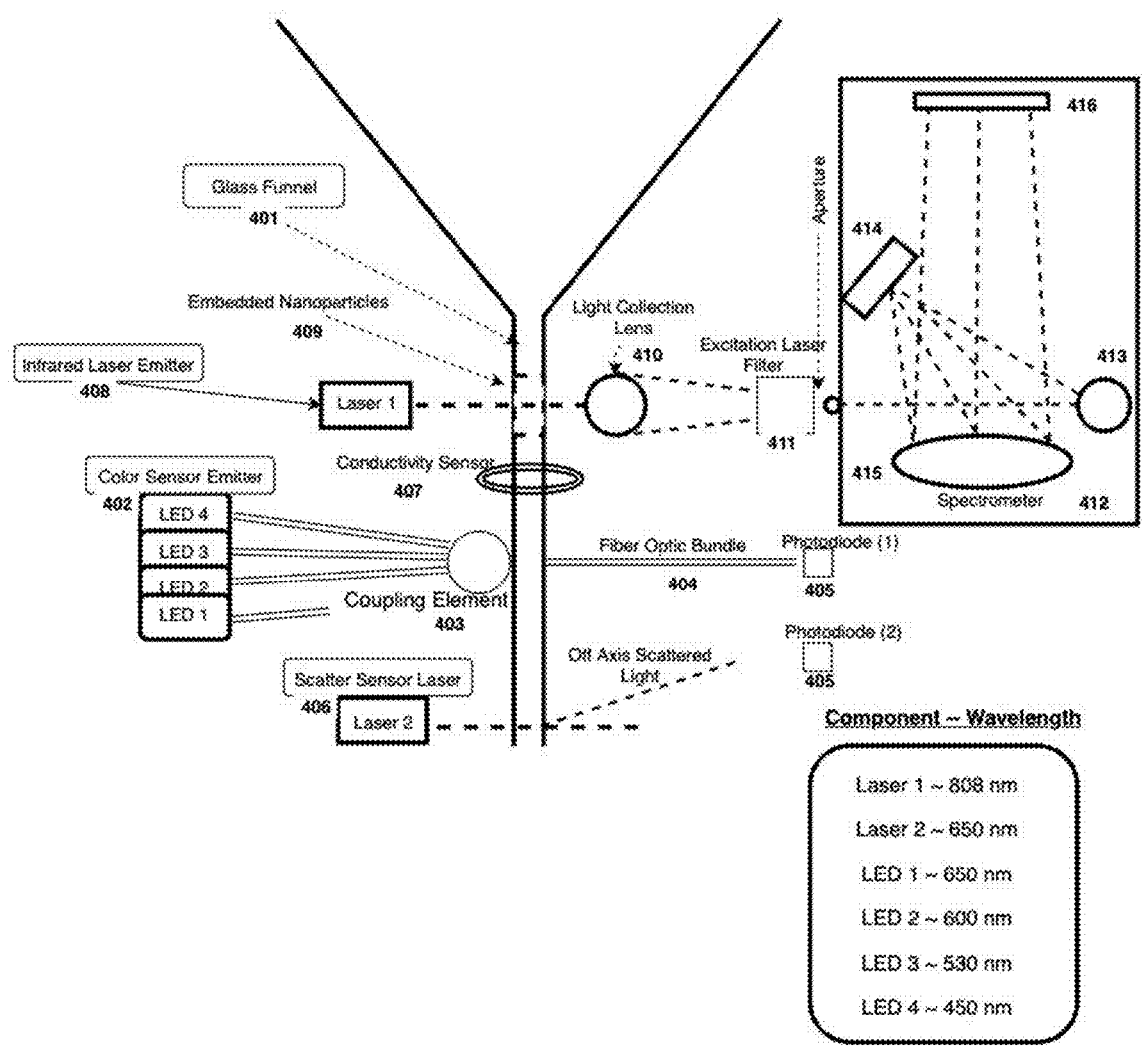

Figure #12
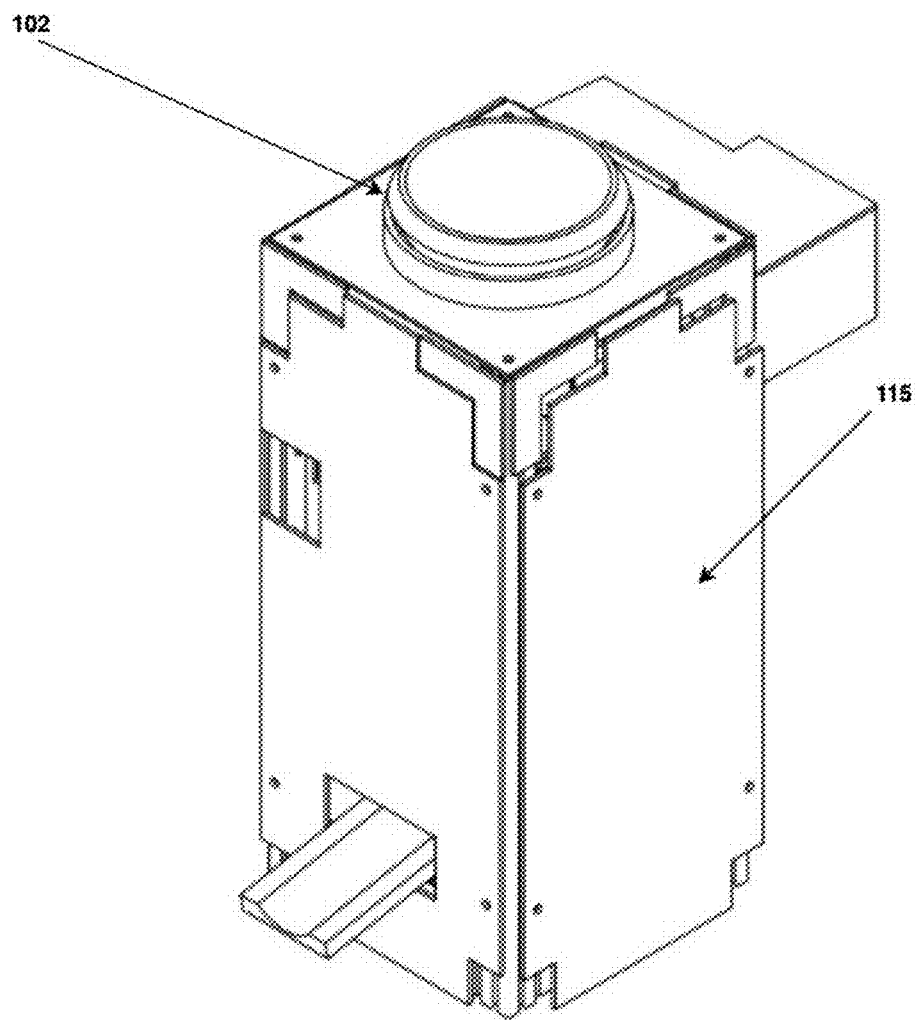

NONDESTRUCTIVE FLUID SENSING

BACKGROUND

Modern Digital Electronics are readily capable of measuring electronic signals from various sources and storing or transmitting those signals to the web. The growth of devices with wireless connectivity is projected to grow tremendously over the next decade. This phenomenon, known as the Internet of Things, is driving efficiency improvements in manufacturing as well as innovation in health science. The invention disclosed herein is a machine that can noninvasively scan fluids or monitor fluid properties, and transfer data wirelessly, as may be desired for process control, optical inspection or data mining across various industries.

Describe the Problem that the Invention is Solving

There has been slow progress in the field of non-contact fluid sensing techniques, and a system that can measure multiple physical properties of a fluid with modern electronics does not yet exist. Nondestructive Sensing techniques are historically capital intensive to implement, and if the processes were better understood, the practicality of such systems would be greatly improved. Real Time Fluid Sensing is an important innovation with major benefits applicable to Manufacturing Processes, Quality Control and Environmental Monitoring, Healthcare and other Industries.

BRIEF SUMMARY OF THE INVENTION

The purpose of this invention is to establish a process to measure a set of physical and chemical properties of a fluid, nondestructively, in near real time, continuously, rapidly and with improvements to maintenance and handling costs. The invention consists of an electronic data capture system, a fluid control subsystem, and the information management system. The nondestructive fluid sensing and characterization system solves the problem of measuring a group of fluid properties without making physical contact, in a manner that is compatible for in-line flow applications. This nondestructive fluid sensing and characterization system has applications for process control, quality control, chemical monitoring and healthcare applications. For example human urine waste data can be measured with an automated terminal system that can serve multiple users in succession, and be operated with little or no maintenance. Such a system has applications for process control and quality control applications as well. The system is a smart device and interacts wirelessly with mobile devices. One major advantage of smart devices is their capability to send information to remote locations over the internet, where it can be stored and later analyzed with online computing resources.

Describing Unique Features of the Invention

The system senses various properties of the fluid without creating disposable waste. Other systems use strips or cartridges that are disposable, and must be replaced before starting a new measurement. By eliminating the need to replace the sensing area, as is typically necessary in chemical tests, the system can rapidly acquire sensor data to detect a larger amount of samples. A unique feature of this invention is the central use of a glass funnel made from a transparent optical glass. Within the glass funnel is an embedded Surface Plasmon Resonant Optical Structure. This device is an important component of the system and is referred to as the Plasmonic Funnel Sensor. This optical structure serves to amplify an optical signal, known as the Raman Signal, that results from the interaction between the light and the fluid sample. The Raman Signal contains information which can be used to determine the chemical signature of fluid sample. The funnel is the ideal shape to channel the fluid towards the Sensing Region. The embedded nanoparticles are located on the inner surface of the funnel in order to make direct contact with the fluid samples. Combined with the use of glass the invention identifies an optical solution towards fluid sensing that eliminates the creation of waste products.

The Plasmonic Funnel Sensor is unique in the way that the device is manufactured, and how it is used. The plasmonic funnel sensor is produced through a two step process where the first step includes depositing selected nanoparticles on the inner surface of the glass funnel, and the second step includes annealing or baking the glass funnel in an oven or similar high temperature chamber such that the nanoparticles are permanently embedded into the glass.

Another unique feature of the Invention is the configuration of the sensors in the system. The configuration of the sensors in the system allows each sensor to interrogate the sample nondestructively along the sensing region. The configuration of the Sensors in the system also allows for compact integration of the sensors within a fixed volume, while simultaneously allowing the fluid to pass in a controlled path. The configuration of the fluid sensing region above a fluid control section is unique. The invention's use of a servomechanism to control the fluid output path is unique. By eliminating waste products, and by specifying multiple fluid control paths, the system can automatically measure and process fluids.

The system is designed to measure different physical and chemical properties of fluids, primarily the Raman Spectroscopy, the conductivity, and the optical transmission coefficient measurements of a fluid passing through a glass tube. The physical properties of the fluids can be used for both qualitative and quantitative measurement purposes. A physical description of the sensors' operational characteristics is included below, and figures for each of the sensors will help the analysis.

1) The Raman Spectrum—the Raman Spectrometer measures the Spectrum of Light resultant from the interaction of a laser beam pulse incident on a special nanoparticle embedded surface. The Surface Enhanced Raman Scattering Signal of the sample material is measured as it flows down the glass funnel. The nanoparticles embedded in the surface of the glass funnel enhance the Raman Stokes and AntiStokes signals that occur due to the laser beam incident in the sample fluid flow. The excitation light frequency is blocked with an optical filter and the signal beams are measured by the spectrometer.

2) The Electrical Conductivity of the fluid is a physical property correlated to the loss and proportional to resistance measurement fluctuations of a toroidal coil LC Tank with respect to sinusoidal electronic excitation signal.

3) The optical transmission coefficient is a physical property that is a qualitative property that is a measurement of the Light Intensity of different Color LEDs, transmitted through the fluid. The intensity of the transmitted light is measured with a Photodiode.

4) The scattering cross section of the fluid is a physical property of the amount of light scattered by the fluid at a particular wavelength. This measurement can be used to estimate the particle size of the flow. The signal is detected by measuring the scattering of laser light through the flow, which emerges from the sample at variable acute angle, 0, degrees away from the laser beam's initial direction. The Intensity of the scattered light is measured with a Photodiode.

The nondestructive fluid sensing system described herein is unique in the way the sensor data is combined to measure different properties of the fluid without making direct contact. The system measures each of the specified measurements rapidly, and automatically. The system can sense when samples are received, take measurements and offload sample results wirelessly.

BRIEF DESCRIPTION OF THE DRAWINGS

FIG. #1 is a sample of representative data from the system.

FIG. #2 is a depiction of the information system between the nondestructive fluid sensing system, different types of connected devices, and an applied computing environment. The information system which describes key components in the system which handle data raw data and process information delivered to the client/user.

FIG. #3 is a depiction of an operating mode between the nondestructive fluid sensing system and a client/user computer.

FIG. #4 is an alternate operating mode that is possible with the nondestructive fluid sensing system and an external computing device or server.

FIG. #5 is an electrical block diagram of this implementation of the system, which includes the sensor components, the communications module and the fluid control electronics.

FIG. #6 is a VHDL block diagram containing details of subroutines which perform the actions and interactions requested by the user/client.

FIG. #7 is a VHDL state machine or flow diagram that shows how the FPGA process flows from one task to the next, through a programmed sequence, and allowing for the operation of software modes.

FIG. #8 is a mechanical drawing that shows the physical construction of a system with the sensor components arranged in a unique configuration that features better integration with better size, weight and handling.

FIG. #9 is a secondary view of the mechanical drawing that shows the physical construction of a system with the sensor components arranged in a unique configuration that features better integration with better size, weight and handling.

FIG. #10 is a fluid control diagram that shows fluid control and flow routing mechanisms in the system.

FIG. #11 is a sensor orientation and optical layout diagram that shows key optical components and sensor orientation in the system.

FIG. #12 is a mechanical drawing showing the isometric view of the apparatus, including the external light blocking panels and the glass funnel installed.

DETAILED DESCRIPTION AND BEST MODE OF IMPLEMENTATION

The Nondestructive Fluid Sensing System consists of Mechanics 100, Fluid Control 200, Electronics 300, Optics 400, and Software 500 components that capture physical and chemical properties of a fluid as described herein. The invention consists of physical structure that receives fluid and channels the fluid towards a sensing region with a funnel that has embedded optical elements with surface plasmon resonant optical properties. The physical structure, depicted in FIG. #8, consists of a mechanical chassis 101, and 3D printed structural components that are 3-D attached with fasteners to position them effectively in the system. The 3D Printed components include the Fluid Control elements. The invention requires an Electronics System 300, including a central processor to control various sensor data acquisition components and communicate wirelessly with external devices. The best way to construct or implement the system is through modern Electronic Systems Design with the use of an FPGA, also known as a Field Programmable Gate Array, or a computer and the complementary interfacial sensor circuitry. The digital output of various sensors is captured, stored and transferred to a computer, smartphone, or online database, where it is further stored and analyzed. The system includes optical components that guide and/or disperse the light before being measured by the various sensors.

The System is a Robotic System for Fluid Processing. Sensing or Data Mining. The Figures included in this specification depict one embodiment of this Embedded System featuring multiple Data Capture Controller blocks. The system measures the sensor outputs and transfers the data frame in either Compressed or Raw Formats, wirelessly. In this implementation of the system, there are two sensing modes, which satisfy the client/user requirements. In the first sensing mode, the device is armed and ready for a sample input. When the sample input is detected, the machine scans the fluid and reports the data back to the computer. This setup can allow for a remote server or Computer to listen for Scans from the Fluid Scanning System. In the second sensing mode, the Computer Initiates the Scan by requesting that the machine scans the fluid and report back to the computer with data. The device pumps fluid from the reservoir and then immediately scans the fluid as it enters the sensing region. After the scan is complete the results are reported back to the computer. The data compression, capture routine, or post processing analysis can be adapted over time to improve performance.

The System Transfers data to the User/Client Device, such as a computer or a smartphone, or directly to an online database. After a request is processed the device prepares itself for the next measurement. The way that the user interacts with the system is unique in that it provides a touch-less interaction with the system. There are hygienic benefits to this as well, which is important for healthcare applications.

FIG. #1 is a sample of representative data from the system. The System is capable of aggregating an increasing amount of measurements, from multiple devices, over time. The Information System is capable of changing its analytical methods and adapting to changes in the data format. FIG. #2 is a depiction of the information system between the nondestructive fluid sensing system, different types of connected devices, and an applied computing environment.

The information system, 500, which describes key components in the system which handle data raw data and process information delivered to the client/user. Changes in the Data Description in the User Device, 502, can be used to sort and classify the scan information.

Changes to the system configuration and capture routine, 501, can be used to alter the sampling frequency and measurements characteristics of each sensor. Changes to the application software can be used to process and classify different fluids that are passed through the nondestructive fluid sensing system.

In this embodiment of the Nondestructive Fluid Sensing System, the Mechanical Structure positions the Glass Funnel Sensor, 102, in the Center of the chassis component, 103, surrounded by the primary electronics circuit board, 112, and the sensors. The entire system is covered with a light blocking panels, 114, that also serve to protect the inner components and improve the signal to noise ratio of the sensor components. Another important subsystem in the Nondestructive Fluid Sensing System is the Fluid Control System components which are detailed in FIG. #10.

The Raman Spectrum is measured by the Raman Spectrometer. The Raman Spectrum or Signal is the Excitation Laser Optical Field after interacting with the fluid and it is enhanced by the Plasmonic Sensor. The plasmonic sensor is the collection of metallic nanoparticles within the glass that resonate at the plasma frequency of the metal nanoparticle electrons. The excitement of the plasmonic sensor with an optical field, that is tuned to the resonance frequency, enhances the optical field between the nanoparticles and thus the Raman signal strength. The interaction between the excitement laser beam and the fluid sample is known as the Raman Effect. The Plasmonic Field between the Gold Nanoparticles known as Surface Plasmon Resonance enhances the Raman Effect Signal. The Plasmonic Gold Nanoparticles are embedded within the Glass Funnel in the System Manufacturing Process. The Spectrometer as Part of the System is designed to separate and measure the relative wave-numbers of the Raman Effect Signal. The Raman Effect Signal can be used to determine chemical signatures of materials adhered or adjacent to the plasmonic substrate, dissolved within the fluid.

The electrical conductivity of the fluid is measure by the Electrical Conductivity Sensor. The Conductivity of the fluid is approximated through the loss and resistance measurement changes of a toroidal coil LC Tank with respect to sinusoidal electronic excitation signal. The sensor exposes the fluid to an Electronic signal and measures the response of the signal to the changing properties of the fluid.

The optical transmission coefficient of the fluid is determined by a Color Sensor which consists of a multitude of different LED Emitters that transmit light sequentially through the sample fluid within the Glass Funnel. In this embodiment, the light emergent from the sample fluid is captured by a series of fibers and transmitted to a photodiode. The photodiode signal is analyzed as the light intensity traveling through sample fluid, and is used to derive the optical transmission coefficient.

The scattering cross section of the fluid is measured by the light scattering sensor. The sensor measures the off-axis angle of the laser light source emergent from the glass tube section and incident of the photodiode. When a laser beam, or directional optical field, is transmitted through a sample fluid within the glass sensing region, the intensity of light scattered by the fluid can be measured by a photodiode. The sensor signal represents the scattering of light by the fluid sample and increases proportionally to the scattering cross section of the fluid.

An Optional Temperature Measurement System with Multiple Sensing Locations through the system can help maintain stable operation and calibration. The Sensor Output is a Digital Readout of the Thermistor Voltage. The Measured Values are between 0-5 Volts and the Digital Readout are −0x7FFF to 0x7FFF or +/−2^15. The Digital Readout Values are converted into temperature Measurements in Celsius.

The System is unique in that it contains a Fluid Control Subsystem with Reservoir, Pump and Diverter Mechanisms. The system is designed to robotically handle the fluid without human intervention. The Fluid Control Diagram, FIG. 6, shows the fluid flow paths that are determined by the angle of the servomechanism. The Fluid passes into the Fluid Control subsystem directly after the sensing region. As the Fluid Emerges from the Sensing Region, it is caught by a molded structure that directs the fluid into a path selected by the state of the servomechanism, that results in storing or ejecting the fluid from the system.

The System is comprised of various physical components that house the Electronics and the Optics for each Sensor. The system design takes advantage of 3-D Printing manufacturing tools to position the Optical, Electrical and Mechanical Components effectively. All physical components may be merged together with 3-D Printing tools to reduce material costs and build time. The Electronics are built with high modern printed circuit board components and then installed into the subsystem enclosures. The sensor components are designed to measure the fluid and report back to the computer After integration of the sensor components with the system hardware, tests are performed to ensure nominal operation. This embodiment of the system uses a self calibration method to ensure the device is operating within range.

The invention claimed is:

1. A nondestructive fluid sensing system that measures fluid properties with a multitude of sensors, and an electronic data capture system that is capable of digitizing signals from said sensors; the nondestructive fluid sensing system comprising:
  a. a glass funnel including a glass sensing region;
  b. a surface enhanced Raman spectroscopy system including a light emitter, a plasmonic enhanced surface and a spectrometer to measure the frequencies of light scattered from a sample fluid in proximity to said plasmonic enhanced surface;
  c. a conductivity sensor that measures signal losses from the said sample fluid in a resonant electromagnetic oscillator circuit, wherein said conductivity sensor comprises a wire wound conductor circulating a paramagnetic toroid;
  d. a color sensor, consisting of a plurality of LED's and a photodiode, each LED having a different center frequency, wherein, an optical path of each LED transects the fluid path in said glass sensing region, and the light transmission through said glass sensing region is captured by said photodiode;
  e. a light scattering sensor, consisting of a laser diode indirectly coupled to a photodiode through the glass sensing region,
  f. wherein the surface enhanced Raman spectroscopy system, the conductivity sensor, color sensor, and the light scattering sensor are oriented around the glass sensing region; and
  g. an electronic data capture system comprising of a circuit that digitizes the signals from the surface enhanced Raman spectroscopy system, the conductivity sensor, color sensor, and the light scattering sensor.

2. The nondestructive fluid sensing system, as described in claim 1, further comprising:
  a robotic fluid control subsystem; said robotic fluid control subsystem is configured to selectively operate in one of two states, fluid storage or fluid ejection, by the means of a servo mechanism; said servo mechanism is configured to receive an electronic signal, from an electronic circuit, to control a flow path of a sample fluid;

wherein surfaces of the flow path are coated with a hydrophobic coating to prevent said sample fluid from adhering to any surface along the flow path;

the subsystem further comprising:
- a. a fluid sample input port;
- b. a fluid reservoir;
- c. a fluid peristaltic pump;
- d. a fluidic circuit interconnected through a tubing subsystem; and
- e. a servo mechanism, configured by an electronic signal, and said servo mechanism has a surface that can control and direct the fluid flow path, between fluid storage and fluid ejection.

3. A nondestructive fluid sensing system comprising:
- a. a glass funnel with a sensing region; said sensing region has metallic nanoparticles or other plasmonic structures embedded in a stem of the glass funnel, for the purpose of enhancing a Raman scattering signal;
- b. wherein the said sensing region of the glass funnel is situated between a light emitter and an optical spectrometer; the said light emitter and said optical spectrometer are configured to interrogate fluid samples flowing through the said glass funnel;
- c. wherein said glass funnel, is configured to accept a sample fluid; said sample fluid is transported and confined into said sensing region and into a fluid control mechanism;
- d. wherein said glass funnel is situated inside of a mechanical structure, and said mechanical structure contains light blocking panels to protect the sensing region from stray light; said mechanical structure contains an electronic data capture system that is configured to digitize optical spectrometer sensor measurements.

* * * * *